United States Patent [19]
Cass

[11] 4,116,504
[45] Sep. 26, 1978

[54] SPHERICAL BEARING AND METHOD OF MAKING THE SAME
[75] Inventor: Ronald F. Cass, Villa Park, Calif.
[73] Assignee: Bertea Corporation, Irvine, Calif.
[21] Appl. No.: 802,068
[22] Filed: May 31, 1977
[51] Int. Cl.² ............................................. F16C 11/06
[52] U.S. Cl. ...................................................... 308/72
[58] Field of Search ........................... 308/72, 29, 194; 29/149.5 B, 148.4 B; 264/242

[56] References Cited
U.S. PATENT DOCUMENTS

| Re. 27,778 | 10/1973 | Potter et al. | 29/149.5 B |
| 2,380,150 | 7/1945 | Collito | 308/72 |
| 3,589,779 | 6/1971 | Sokol | 308/72 |
| 3,769,672 | 11/1973 | Eklund | 29/149.5 B |
| 3,874,050 | 4/1975 | White | 29/149.5 B |

Primary Examiner—Trygve M. Blix
Assistant Examiner—Charles E. Frankfort
Attorney, Agent, or Firm—Gordon L. Peterson

[57] ABSTRACT

A bearing comprising a housing including an outer bearing member having an insert receiving surface and at least one insert sized to be received within the insert receiving surface. A ball and a bearing liner are provided within the housing. Adhesive extruded from the bearing liner during assembly of the bearing is provided between the insert and the insert receiving surface to at least assist in retaining the insert within the insert receiving surface.

12 Claims, 7 Drawing Figures

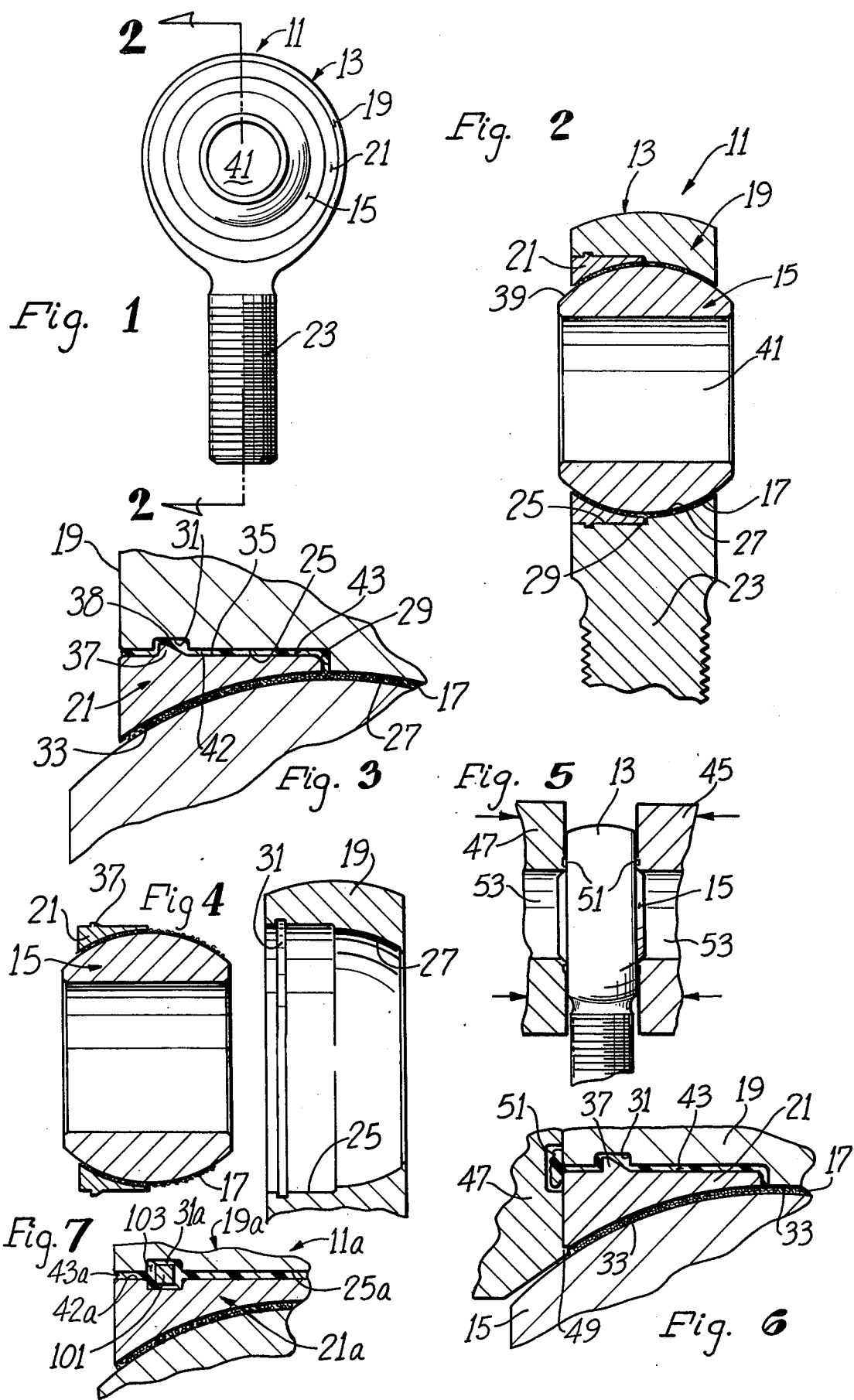

SPHERICAL BEARING AND METHOD OF MAKING THE SAME

BACKGROUND OF THE INVENTION

Spherical bearings typically include an inner bearing member which may be in the form of a ball, a housing and a bearing liner between the ball and the housing. The housing has a spherical surface to which the bearing liner can be adhered.

One problem with spherical bearings occurs in assembly. Because the diameters of the ball and the spherical surface of the housing are about the same, obviously the ball cannot be inserted into the housing unless some special provision for insertion is provided.

Many different ways of constructing the housing about the ball are known. For example, U.S. Pat. No. Re. 27,778 issued to Potter et al shows a spherical bearing in which the bore in the housing is enlarged to receive one or two bushings which define all or a portion of the inner spherical surface of the housing. The bushings are attached to the housing with an electron beam weld, and this tends to provide a crack which can create a fatigue strength problem.

Similary, in U.S. Pat. No. 3,874,050 issued to White, a spherical bearing is shown in which a pair of bushings are threaded into, and form a portion of, the housing with the bushings defining the internal spherical surface of the housing. This requires that both the bushings and the housing be threaded and that care be taken to assure that each of the bushings is threaded into the housing an appropriate amount. In addition, for a housing of a given size, this construction is not as strong as desired in tension and fatique.

It is also known to retain race segments in a housing using a steel wire or similar means. This is shown, for example, in U.S. Pat. No. 3,769,672 issued to Eklund. This also lacks the desired tensile and fatigue strength.

SUMMARY OF THE INVENTION

The present invention increases the tensile and fatigue strength of bearings. In addition, the assembly of spherical bearings is greatly simplified.

For example, the present invention is applicable to a spherical bearing in which the bearing housing includes an outer bearing member having an insert receiving surface and at least one insert sized to be received within the insert receiving surface. When the insert is not in position in the outer bearing member, a loading path is provided which enables the inner bearing member to be inserted into the housing. A bearing liner is provided between the housing and the inner bearing member. The insert is then attached to the first outer bearing member to retain the inner bearing member within the housing. The insert, the outer bearing member and the inner bearing member have bearing liner supporting surfaces which are engaged by the bearing liner.

The insert can advantageously be adhesively attached to the outer bearing member. Although the adhesive for attaching the insert to the first outer bearing member may be derived from different sources, it is preferably obtained, at least in part, from the bearing liner. For example, the bearing liner typically includes an adhesive or resin which can be caused to flow to the region between the insert and the outer bearing member when the bearing liner is heated and squeezed between the insert and the inner bearing member. This further simplifies the assembly process in that the adhesive is inherently provided as part of the bearing liner. In addition, the insert can be bonded to the outer bearing member during the same time that the bearing liner is being bonded to the housing so no additional time is required.

The bearing also preferably includes mechanical means for at least assisting in retaining the insert within the outer bearing member. The mechanical means, which may be of various different constructions, may serve as a safety or back-up attachment means for attaching the insert to the outer bearing member.

The mechanical means may include a snap-fit retention means which includes, for example, a cooperating projection and recess on the insert and the outer bearing member. For example, the projection may be integral with the insert or it may be a separate split or unsplit retaining ring. The insert can be made resiliently deformable so that it can be pressed into the outer bearing member until the projection enters the recess to permit the insert to expand radially outwardly. In the case where a separate retaining ring is used, the ring can be resiliently deformable to facilitate assembly. Preferably, the snap-fit retention means is located so that the projection snaps into the recess when the insert has been inserted to approximately the desired location within the outer bearing member. With the projection in the recess, there is preferably a slight clearance space between the circumferential surfaces of the insert and the outer bearing member to provide a gap into which the adhesive can be extruded.

In the preferred form of the invention, the adhesive forms the primary means for attaching the insert to the outer bearing member. However, the snap-fit retention means provides a safety or secondary means for retaining the insert. In addition, by appropriately positioning the snap-fit means, it can be used to assist in locating the insert. Finally, the snap-fit retention means has certain advantages in connection with the method of assembly described hereinbelow.

Although multiple inserts can be used if desired, to increase strength and to facilitate assembly, preferably only one insert of an annular configuration is employed. In the case of an eyebolt, strength is improved if the outer bearing member is an integral, one-piece member which defines the eyebolt housing. The insert functions to hold the inner bearing member within the housing and it also supports a portion of the bearing liner. The insert is preferably small in relation to the outer bearing member, and the latter serves as the primary structural member of the housing.

To assemble the bearing, the inner bearing member with the bearing liner thereon and the insert are inserted into the outer bearing member. Advancing the insert axially into the insert receiving surface of the outer bearing member results in extrusion of adhesive from the bearing liner into the region between the insert and the outer bearing member. The insert is held in this position until the adhesive cures.

Various techniques can be used to cause the adhesive to flow. For example, the adhesive may be a thermosetting resin which has been cured to the B stage to make it thermoplastic. Heat can be applied to the bearing liner in various different ways, such as by preheating the outer bearing member to facilitate the extrusion of the resin.

To assure that the resin flows between the insert and the outer bearing member, the opposite edges of the bearing liner can be appropriately confined during the extrusion process. This can be advantageously accomplished by using the same tooling which advances the insert into the outer member to substantially seal off the ends of the bearing liner.

If desired, the snap-fit means or other mechanical retention means can be used to retain the insert within the outer bearing member while the resin is curing. Alternatively, the tooling can be left in position until a partial or initial curing of the resin is obtained, and thereafter the mechanical retention means can be used for this purpose.

The invention, together with further features and advantages thereof, may best be understood by reference to the following description taken in connection with the accompanying illustrative drawings.

BRIEF DESCRIPTION OF THE DRAWING

FIG. 1 is a side elevational view of a rod end bearing constructed in accordance with the teachings of this invention.

FIG. 2 is an enlarged, fragmentary sectional view taken generally along line 2—2 of FIG. 1.

FIG. 3 is an enlarged, fragmentary sectional view of a portion of the bearing.

FIG. 4 is an exploded view in section showing an initial phase in assembling the bearing.

FIG. 5 is a fragmentary, elevational view partially in section showing the bearing and the tooling for assembling the bearing.

FIG. 6 is an enlarged, fragmentary sectional view similar to FIG. 3 with a portion of the tooling also being illustrated.

FIG. 7 is an enlarged, fragmentary view of an alternate embodiment of the rod end bearing in which a separate retaining ring forms a portion of the mechanical retaining means.

DESCRIPTION OF THE PREFERRED EMBODIMENT

FIGS. 1–3 show a spherical bearing 11 which includes an eyebolt housing 13 in the form of a rod end, an inner bearing member in the form of a ball 15, and a bearing liner 17 between the housing 13 and the inner bearing member 15. The housing 13, which is preferably constructed of a suitable metal, such as steel or aluminum, includes an outer bearing member 19 and an insert 21. The outer bearing member 19 forms the major portion of the housing and has an externally threaded stud 23 at one end thereof to permit the bearing 11 to be threadedly attached to an external member (not shown).

The outer bearing member 19 has a generally cylindrical insert receiving surface 25 defining a loading path, a bearing liner supporting surface 27, and an annular shoulder 29 between these surfaces. The bearing liner supporting surface 27 is of a generally spherical configuration and has been roughened, as by grit blasting, to facilitate adhesive attachment of the bearing liner 17 thereto. The insert receiving surface 25 has an annular recess in the form of a groove 31 therein. The surfaces 25 and 27 form an axial passage extending completely through the outer bearing member 19.

The insert 21, which is preferably integral and annular, has a bearing liner supporting surface 33 of a generally spherical configuration which has been roughened to facilitate adherence of the bearing liner 17 thereto. The insert 21 has an outer generally cylindrical surface 35 of slightly less diameter than the insert receiving surface 25. An integral annular projection 37 having a sloping forward face 38 is of slightly greater diameter than the surface 25. The projection 37 extends radially outwardly and is adapted to be received within the groove 31. The projection 37 is sized to form an interference fit with the surface 25. However, the insert 21 is constructed of resilient deformable metal so that it can be press fit into the surface 25 until the projection 37 snaps into the groove 31 as shown in FIG. 3. Thus, the projection 37 and the groove 31 form snap-fit retention means for at least assisting in retaining the insert 21 within the outer bearing member 19. Other mechanical retention means can be used if desired.

The ball 15 has an outer polished spherical surface 39. The ball 15, which is preferably constructed of a suitable metal such as steel or aluminum, has a cylindrical axial passage 41 extending therethrough and adapted to receive another member (not shown).

The bearing liner 17 has a smooth, low-friction surface confronting the ball 15. The bearing liner may be of any type which is suitable for the purposes to which the bearing 11 is to be put. Preferably, the bearing liner 17 includes a plurality of elements held together by an adhesive or binder. By way of example, the elements may be individual fibers or threads, or the bearing liner may be a wound bearing liner of the type described in White U.S. Pat. No. 3,874,050 in which event each of the elements may be considered as one turn of the winding. For example, the adhesive may be a suitable resin, such as a phenolic resin or a polyimide resin.

With the bearing assembled as shown in FIGS. 1–3, the insert 21 and outer bearing member 19 define an annular extrusion channel 42 which extends from the bearing liner 17 to the exterior of the bearing 11 and which lies between the insert 21 and the outer bearing member 19. A layer 43 of adhesive is in the extrusion channel 42. The layer of adhesive 43 is preferably extruded from the bearing liner 17 during the assembly process. Accordingly, the layer of adhesive 43 is the same resin that is used in the bearing liner 17. Although the bearing liner 17 can be adhered to either the housing 13 or the ball 15, in the embodiment illustrated, it is adhered to the bearing liner supporting surfaces 27 and 33.

According to the method of this invention, the bearing liner 17 is suitably provided on the ball 15. This can be accomplished in different ways, such as by winding a layer of bondable low-friction thread which has been thoroughly impregnated with a bonding resin around the ball 15, as described in White U.S. Pat. No. 3,874,050. The resin is preferably a thermosetting resin, and at the time the thread is wound onto the ball 15, the resin should be essentially solidified, although it may be slightly tacky to facilitate temporary sticking to the ball in the position in which it is wrapped on. if a thermosetting resin is used, the resin should preferably be in the B-stage condition, i.e., essentially free of all volatile solvents or other gas producing substances.

Next, the insert 21 is positioned on the bearing liner 17 as shown in FIG. 4, and the composite structure is advanced into the outer bearing member 19. Alternatively, the ball 15 and bearing liner 17 are first inserted into the outer bearing member 19 and then the insert 21 is inserted. In either event, the surface 33 of the insert 21 and the surfaces 25, 27 and 29 of the outer bearing member 19 may have a brush coat of resin previously applied thereto as a primer.

Assembly can advantageously be carried out with the tools 45 and 47. The tool 45 engages the side of the outer bearing member 19 remote from the surface 25. The tool 47 pushes the insert 21 and the ball 15 into the outer bearing member 19 until the tool 47 engages the side face of the outer bearing member 19. The ball 15 easily enters the outer bearing member 19 due to the relatively large diameter surface 25. However, the projection 37 forms an interference fit with the portion of the surface 25 lying axially outwardly of the groove 31. To minimize the length of this surface 25 over which the interference fit exists, the groove 31 is preferably located closer to the outer end of the surface 25 than to the inner end of the surface 25. When the projection 37 engages the surface 25, the insert 21 is resiliently deformed radially inwardly, and this is facilitated by the sloping face 38 on the leading edge of the projection 37.

Continued advancing movement of the tools 45 and 47 forces the insert 21 against the portion of the bearing liner 17 which is supported by the ball 15. In order to get the resin to flow, heat must be applied. Heat can be applied in different ways, such as by preheating the tools 45 and 47 and the outer bearing member 19. The heat and pressure cause some of the resin of the bearing liner 17 to flow into the extrusion channel 42 between the insert 21 and the outer bearing member 19 as shown in FIG. 6. To assure that the resin does not escape along the opposite edges of the liner 17, the tool 47 has an annular sealing lip 49 which confronts one edge of the bearing liner 17 as shown in FIG. 6. Specifically, the lip 49 of the tool 47 substantially seals the gap between the ball 15 and the insert 21 along one outer edge of the bearing liner 17 to shut off this flow path for the resin from the bearing liner. The tool 45 has an identical annular sealing lip (not shown) which functions similarly to prevent the flowing resin from leaking out along the edge adjacent the tool 45. To provide for the escape of any excess resin from the extrusion channel 42, the tool 47 has an opening 51 which communicates with the interface between the insert 21 and the outer bearing member 19. The tool 45 may also have a recess 51 so that the tools 45 and 47 are interchangeable. Also, to accommodate the portion of the ball 15 which projects axially beyond the housing 13, each of the tools has a central recess 53.

The tools 45 and 47 are held in the position shown in FIG. 5 and 6 until the resin of the layer 43 is partially cured to the C stage. Thereafter, the tools 45 and 47 are removed and the bearing 13 is baked at an appropriate temperature and for an appropriate period to finish curing the resin to thereby cause the layer 43 to firmly bond the insert 21 to the outer bearing member 19. The curing of the resin also bonds the bearing liner 17 to the surfaces 27 and 33. Any bond between the bearing liner and the ball 15 is weak and easily broken due to the highly polished nature of the surface 39.

In this manner, the insert 21 is firmly attached to the outer bearing member 19. This is accomplished using basically the same steps which would be necessary in any event to bond the bearing liner 17 to the housing 13.

FIG. 7 shows a spherical bearing 11a which is identical to the spherical bearing 11, except that the former uses a different kind of snap-fit retention means for at least assisting in retaining the insert 21a within the insert receiving surface 25a. The bearing 11a is particularly adapted for large diameter bearings but it may be used on smaller diameter bearings also. Portions of the bearing 11a corresponding to portions of the bearing 11 are designated by corresponding reference numerals followed by the letter "a."

In the bearing 11a, a separate retaining ring 101 and an annular groove 103 in the insert 21a replace the annular projection 37 of the bearing 11. With this construction, the retaining ring 101 is seated within the annular grooves 31a and 103 to at least assist in retaining the insert 21a within the insert receiving surface 25a.

To facilitate assembly, the retaining ring 101 should be split in an axial plane, or if it is unsplit, it is preferably resilient. The groove 31a is at the same location on the housing 13a as the groove 31. As with the bearing 11, a layer of adhesive 43a fills the extrusion channel 42a.

The bearing 11a can be assembled in the same manner as described above for the bearing 11. However, making of the insert 21a resilient is optional in that the retaining ring 101 is sufficiently resilient to facilitate assembly. During assembly, the retaining ring 101 can be carried by either of the grooves 31a or 103, and when the insert 21a has been inserted the appropriate amount into the insert receiving surface 25a, the retaining ring 101 snaps into the other of the grooves.

Although an exemplary embodiment of the invention has been shown and described, many changes, modifications and substitutions may be made by one having ordinary skill in the art without necessarily departing from the spirit and scope of this invention.

I claim:

1. A bearing comprising:
   outer bearing means including an outer bearing member having an annular insert receiving surface and at least one annular insert sized to be received within said insert receiving surface;
   snap-fit retention means including at least one annular projection and at least one annular recess for forming a snap fit to at least assist in retaining the insert within said insert receiving surface of said outer bearing member, said insert being sized so that it can be pressed into the outer bearing member until the projection snaps into the recess;
   an inner bearing member at least partly within said outer bearing member, said inner bearing member being retained in the outer bearing member by said insert;
   a bearing liner between said inner bearing member and said outer bearing means;
   said outer bearing means including inner surface means for engaging and supporting said bearing liner, at least a portion of said inner surface means being defined by said insert whereby the inner bearing member and the outer bearing means can undergo relative movement; and
   an adhesive between said insert and said outer bearing member for at least assisting in retaining the insert within said outer bearing member.

2. A bearing as defined in claim 1 wherein said outer bearing member is a one-piece eyebolt housing having a threaded stud and said bearing includes only one of said inserts.

3. A bearing as defined in claim 1 wherein said projection includes a retaining ring, said one recess is an annular groove in said insert, said snap-fit retention means includes an annular groove in said insert receiving surface, and said retaining ring is seated in said grooves.

4. A bearing as defined in claim 1 wherein said projection is integral with said insert and said recess is formed in said insert receiving surface, said insert being resilient so that it can be deformed radially inwardly while it is being pressed into the outer bearing member and can snap the projection into the recess.

5. A bearing as defined in claim 4 wherein said insert receiving surface includes a generally cylindrical surface having said annular recess thereon, said cylindrical surface having an outer end and an inner end and said annular recess being nearer said outer end than said inner end to reduce the length of said cylindrical surface through which the insert must be pressed, and said projection having a sloping forward face to facilitate deforming the insert radially inwardly.

6. A bearing as defined in claim 1 wherein said insert receiving surface includes a generally cylindrical surface having said annular recess thereon, said cylindrical surface having an outer end and an inner end and said annular recess being nearer said outer end than said inner end to reduce the length of said cylindrical surface through which the insert must be pressed.

7. A bearing comprising:
outer bearing means including an outer bearing member having an insert receiving surface, a bearing liner supporting surface, and a shoulder between said surfaces;
said outer bearing means including an annular insert sized to be received within said insert receiving surface, said insert having an inner bearing liner supporting surface;
a projection on one of said insert and said insert receiving surface and a recess on the other of said insert and the insert receiving surface, said insert being resiliently deformable and said projection being receivable in said recess to form a snap-fit connection between said insert and said outer bearing member;
a bearing liner adhered to the bearing liner supporting surfaces of said outer bearing member and said insert, said bearing liner including a plurality of elements and resin for bonding the elements together, said bearing liner having an inner low-friction, spherical surface;
an adhesive for adhering the insert to the outer bearing member, some of said resin being extruded from said bearing liner between the insert and the outer bearing member to form at least some of said adhesive; and
an inner bearing member within the outer bearing means, said inner bearing member having an outer spherical surface adapted to engage and slide on said bearing liner.

8. A bearing comprising:
outer bearing means including an outer bearing member having an insert receiving surface and at least one insert sized to be received within said insert receiving surface;
an inner bearing member at least partly within said outer bearing member;
a bearing liner between said inner bearing member and said outer bearing means;
said outer bearing means including bearing liner supporting surface means for engaging and supporting said bearing liner, at least a portion of said surface means being defined by said insert whereby the inner bearing member and the outer bearing means can undergo relative movement;
an adhesive for retaining the insert within the outer bearing member; and
said bearing liner including a plurality of elements and a resin for bonding said elements together, some of said resin from the bearing liner being extruded between the insert and the outer bearing member to form at least some of said adhesive which retains the insert within the outer bearing member.

9. A bearing as defined in claim 8 including mechanical means providing a safety device to assure that the insert remains within the insert receiving surface.

10. A bearing as defined in claim 8 wherein said outer bearing member is a one-piece eyebolt housing having a threaded stud at one end and said bearing includes only one of said inserts.

11. A bearing comprising:
outer bearing means including fan outer bearing member having an insert receiving surface and at least one insert sized to be received within said insert receiving surface;
an inner bearing member at least partly within said outer bearing member;
a bearing liner between said inner bearing member and said outer bearing means, said bearing liner including a binder;
said outer bearing means including bearing liner supporting surface means for engaging and supporting said bearing liner, at least a portion of said surface means being defined by said insert whereby the inner bearing member and the outer bearing means can undergo relative movement;
an adhesive for retaining the insert within the outer bearing member; and
mechanical means providing a safety device to assure that the insert remains within the insert receiving surface, said mechanical means including snap-fit retention means including at least one projection and at least one recess for forming a snap fit to at least assist in retaining the insert within said insert receiving surface of said outer bearing member, said insert and said outer bearing member being slightly spaced to define an extrusion channel which communicates with the bearing liner to receive binder extruded from the bearing liner.

12. A bearing as defined in claim 11 wherein said projection is annular and has a sloping cam face.

* * * * *